United States Patent
Negishi et al.

(10) Patent No.: US 6,726,218 B2
(45) Date of Patent: Apr. 27, 2004

(54) COMPRESSION PISTON RING FOR USE IN INTERNAL COMBUSTION ENGINE

(75) Inventors: Hideo Negishi, Hino (JP); Hideshi Hitosugi, Saitama (JP); Hideyo Iwama, Saitama (JP)

(73) Assignee: Nippon Piston Ring Co., Ltd., Saitama (JP)

( * ) Notice: Subject to any disclaimer, the term of this patent is extended or adjusted under 35 U.S.C. 154(b) by 0 days.

(21) Appl. No.: 09/969,655

(22) Filed: Oct. 4, 2001

(65) Prior Publication Data

US 2002/0074733 A1 Jun. 20, 2002

(30) Foreign Application Priority Data

Oct. 5, 2000 (JP) ........................ 2000-306414

(51) Int. Cl.[7] .................................................. F16J 9/12
(52) U.S. Cl. ........................................ 277/496; 277/498
(58) Field of Search ................................. 277/435, 447, 277/496–499, 493, 489, 477, 440, 485, 487

(56) References Cited

U.S. PATENT DOCUMENTS

| | | | | | |
|---|---|---|---|---|---|
| 1,446,658 | A | * | 2/1923 | Pelletier ...................... 277/467 |
| 2,131,230 | A | * | 9/1938 | Morgan ....................... 277/446 |
| 2,269,763 | A | * | 1/1942 | Grant .......................... 277/472 |
| 2,459,395 | A | * | 1/1949 | Smith ......................... 277/460 |
| 2,560,775 | A | * | 7/1951 | Olsen ......................... 277/460 |
| 3,671,047 | A | * | 6/1972 | Umezawa .................... 277/444 |
| 3,751,047 | A | * | 8/1973 | McGee ....................... 277/468 |
| 4,040,637 | A | * | 8/1977 | McCormick ................ 277/460 |
| 4,123,072 | A | * | 10/1978 | Sharpe ........................ 277/453 |
| 4,421,328 | A | * | 12/1983 | Thurston et al. ............ 277/460 |
| 4,452,464 | A | * | 6/1984 | Furuhama .................... 277/457 |
| 4,735,128 | A | * | 4/1988 | Mahrus et al. ................ 92/212 |
| 4,966,068 | A | * | 10/1990 | Ficht et al. .................... 92/193 |
| 5,106,208 | A | * | 4/1992 | Bobo et al. .................... 384/99 |
| 5,695,199 | A | * | 12/1997 | Rao et al. ................... 277/455 |

FOREIGN PATENT DOCUMENTS

| JP | 2000-120866 | | 4/2000 |
|---|---|---|---|
| WO | WO 97/11295 | * | 3/1997 |

\* cited by examiner

*Primary Examiner*—Alison K. Pickard
(74) *Attorney, Agent, or Firm*—Sughrue Mion, PLLC (57) ABSTRACT

A compression piston ring capable of reducing excessive surface pressure at a gap and adjacent portion thereto during engine operation, and capable of being produced at a low cost. The compression piston ring has generally circular shape without any notched portion. The compression piston ring has a dimensional requirements in that d1/a1 ranges from 40 to 60, and d1/h1 ranges from 30 to 55, in which d1 represents an inner diameter of the piston ring, a1 represents a radial length between inner and outer peripheral surfaces of the piston ring, and h1 represents an axial length of the outer peripheral surface. The compression piston ring is particularly available as a first compression piston ring for a supercharging type diesel engine providing high engine pressure.

6 Claims, 7 Drawing Sheets

COMPRESSION PISTON RING FOR USE IN INTERNAL COMBUSTION ENGINE

BACKGROUND OF THE INVENTION

The present invention relates to a compression piston ring for use in an internal combustion engine, and more particularly, to a type thereof capable of providing a superior advantage when used as a first compression piston ring of a compression-ignition engine (diesel engine), the first compression piston ring being positioned closer to a combustion chamber than is a second and subsequent compression ring(s).

Conventionally, a low point piston ring has been widely used in which an ovality of the ring is set not more than zero to provide an elliptic shape so as to reduce the surface pressure at the position nearby gap of the ring at a room temperature, thereby restraining increase in the surface pressure at the gap end during actual engine operation, to thus avoid generation of cracks and peel-off of a surface treatment layer of the ring.

Figure 7:
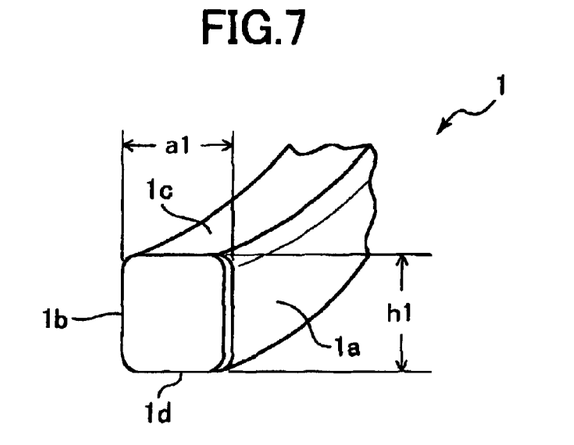
FIG. 7 is a perspective view showing a cross-sectional shape of the first compression piston ring according to the first embodiment of the present invention.

Japanese Patent Application Publication No. 2000-120866 discloses a compression ring in which after the ring is subjected to surface treatment, a notched portion is formed at an inner peripheral surface of the ring at a position near the gap so as to partly decrease a radial length of the ring (the radial length being corresponding to "a1" in FIG. 7). This is an improvement on conflicting problems in that sufficient wear resistance is not obtained if attention is only drawn to the prevention of partial gap between an outer peripheral surface of the piston ring and the inner peripheral surface of the cylinder liner, and the partial gap may occur if attention is only drawn to the reduction in surface pressure at the gap. According to the disclosed piston ring, increase in surface pressure at the gap during engine operation can be restrained by a change in a ring curvature and by the reduction in bending rigidity near the gap, those being caused by the formation of the notch. Accordingly, generation of crack and peel-off of the surface treatment layer can be avoided. Such piston ring can be used in a supercharging type diesel engine providing a severe operating condition.

In a low-point piston ring whose ring shape is regulated and in the piston ring disclosed in Japanese Patent Application Publication No. 2000-120866, surface pressure increase near the gap can be restrained to reduce the excessive wear of the sliding surface.

However, in such a low-point piston ring produced by regulating the ring shape, surface pressure near the gap is lower than that of a piston ring providing an equal surface pressure over its periphery at a room temperature. Accordingly, a problem occurs in machining the outer peripheral surface of the low-point ring, particularly in a lapping process. More specifically, generally, during machining to the outer peripheral surface of the ring, a grinding jig is in pressure contact with the outer peripheral surface with a constant pressure at any portion of the ring in a circumferential direction thereof because of the self expanding property of the ring so as to provide an ultimate configuration of the sliding surface of the ring. However, in case of the low-point piston ring wherein the circumferential shape is regulated, the surface pressure near the gap is provisionally lowered prior to the machining to the outer peripheral surface. Therefore, contacting degree between the grinding jig and the ring is lowered, thereby disabling desirable machining for providing a desired shape near the gap.

In order to obviate this problem, a proposal has been made in that the ring and the grinding jig are provisionally heated to provide a temperature distribution similar to that in the engine operation in an attempt to allow the ring portion near the gap to be in intimate contact with the grinding jig because of thermal deformation. However, in reality, it would be extremely difficult to perform machining with the simulated temperature distribution.

Further, in the piston ring formed with the notch at the inner peripheral surface and near the gap as disclosed in Japanese Patent Application Publication No. 2000-120866, the radial length (corresponding to "a1" in FIG. 7) is locally reduced by locally cutting and grinding the inner peripheral surface of the ring near the gap after surface treatment to the ring. If an entire surface of the ring is subjected to nitriding treatment, cutting efficiency is extremely lowered due to high hardness of the nitriding layer. Accordingly, shortened service life of a cutting tool results. Even if the surface treatment to the ring has not been made, great amount of the ring part must be removed by cutting and grinding for the formation of the notch. This requires a prolonged machining period. Consequently, production cost is greatly increased with the addition of the process of machining and grinding to nearby the gap.

SUMMARY OF THE INVENTION

It is an object of the present invention to overcome the above-described problems and to provide a compression piston ring for an internal combustion engine capable of restraining excessive surface pressure increase nearby the gap during engine operation and capable of being produced at a low cost.

This and other objects of the present invention will be attained by a compression piston ring for use in an internal combustion engine, the piston ring having a generally circular shape and having an outer peripheral sliding surface in sliding contact with a cylinder and an inner peripheral surface in confrontation with a piston, a gap being formed to provide a discontinuity of a circle. The compression piston ring proves d1/a1 ranging from 40 to 60 and provides d1/h1 ranging from 30 to 55, in which d1 represents an inner diameter defined by the inner peripheral surface, a1 represents a radial distance between the inner peripheral surface and the outer peripheral sliding surface, and h1 represents an axial length of the outer peripheral sliding surface.

In another aspect of the invention, there is provided a diesel engine including a cylinder, a piston reciprocally movable with respect to the cylinder, and having an outer peripheral surface formed with a plurality of annular piston ring grooves, a combustion chamber being defined above the piston, and the above described first compression piston ring assembled in a first piston ring groove positioned closest to the combustion chamber among the plurality of the piston ring grooves.

The above described range of d1/a1 is relatively greater than that of the conventional compression piston ring, and a1 dimension at not only the gap and near the gap but also at overall circumference of the piston ring of the present invention is relatively smaller than that of the conventional piston ring. With this arrangement, a distance between the inner and outer peripheral surfaces of the piston ring is reduced to provide a moderate temperature gradient therebetween. Accordingly, excessive increase in surface pressure at the gap and a portion adjacent thereto can be suppressed. Further, sealing performance between the upper end face of the piston ring and the upper surface of the piston ring groove and between the lower end face of the piston ring and the lower surface of the piston ring groove can be maintained, and mobility of the piston ring within the piston ring groove can be stabilized during engine operation.

Further, because a1 dimension is constant over the entire circumference of the piston ring, machining to a particular inner peripheral surface portion of the piston ring is not required, thereby lowering production cost. Furthermore, because d1/h1 ranges from 30 to 55, wear at the upper and lower surfaces of the piston ring groove can be restrained thereby maintaining sealability between the piston ring and the piston ring groove at the upper and lower surfaces. Moreover, this dimensional limitation can maintain heat transmitting efficiency of the piston ring for transmitting heat from the piston to the cylinder and can also maintain self expansion force of the piston ring.

If the compression piston ring of the present invention is used in a supercharging type diesel engine, the piston ring is exposed to extremely high engine pressure during engine operation. Even though the compression piston ring does not provide high self-expansion force because of small a1 dimension, the small a1 dimension can provide low bending rigidity of the piston ring, so that the outer peripheral sliding surface of the piston ring can be brought into intimate contact with the cylinder during engine operation by the high engine pressure applied to the inner peripheral surface of the piston ring. Accordingly, a combustion gas and lubrication oil can be effectively sealed. If the compression piston ring is used as a first compression piston ring to which the engine pressure is directly applied, the sufficient sealing function results.

DETAILED DESCRIPTION OF THE PREFERRED EMBODIMENTS

A compression piston ring according to a first embodiment of the present invention will be described with reference to FIGS. 1(a) through 7, the compression piston ring being used as a first compression piston ring.

Figure 1A:
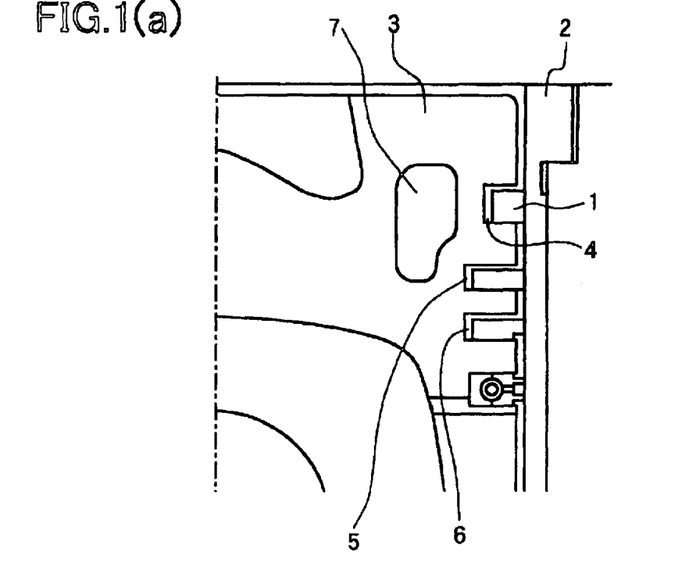
FIG. 1(a) is a cross-sectional view showing a piston, piston rings including a first compression piston ring according to a first embodiment of the present invention, and a cylinder liner.
Figure 1B:
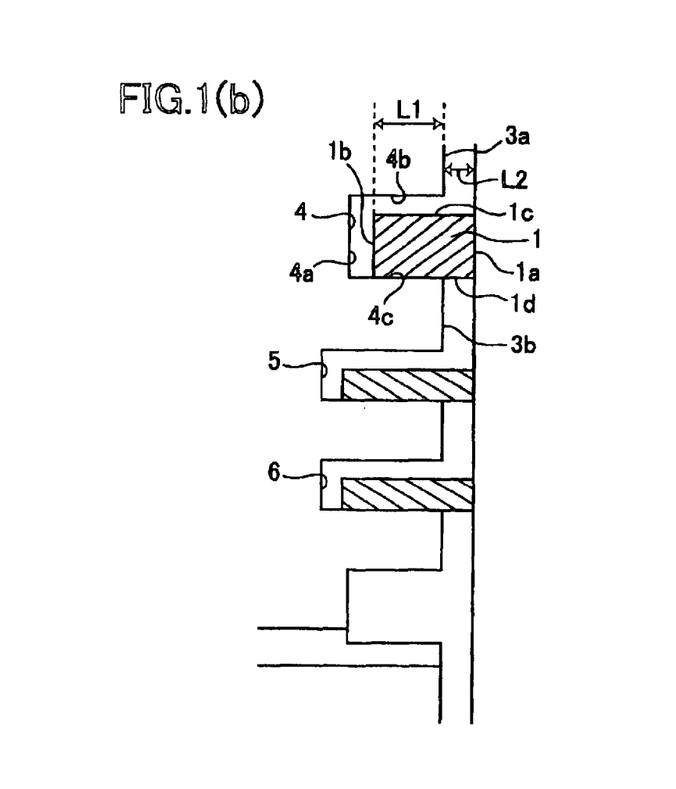
FIG. 1(b) is an enlarged cross-sectional view particularly showing the geometrical relationship among the first compression piston ring, the piston and the cylinder.
Figure 10:
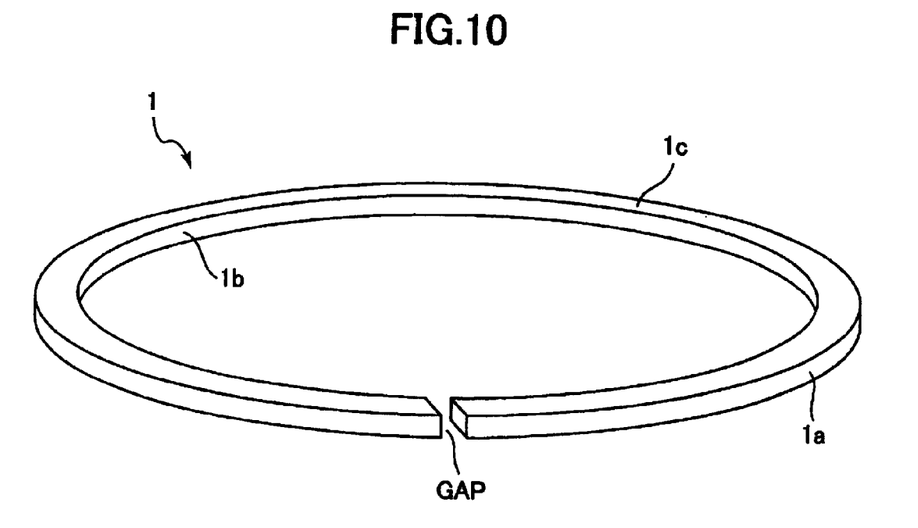
FIG. 10 is a perspective viewing showing a circular piston ring with a gap.

FIG. 1 shows an internal arrangement of an internal combustion engine. A piston 3 is reciprocally movable within a cylinder 2, and a hollow space is provided between the piston 3 and the cylinder 2. Piston ring grooves 4, 5, 6 are formed at an outer peripheral surface of the piston 3, and the first compression piston ring 1 is assembled in the piston ring groove 4 which is positioned most closest to a combustion chamber among the grooves 4, 5, 6. As also shown in FIGS. 7 and 10, the first compression piston ring 1 has a rectangular cross-section, and has an outer peripheral sliding surface 1a in sliding contact with the cylinder 2, an inner peripheral surface 1b, an upper end face 1c and a lower end face 1d.

The piston ring groove 4 has a bottom face 4a extending in an axial direction of the piston 3, an upper face 4b and a lower face 4c. A hollow clearance is provided between the bottom face 4a and the inner peripheral surface 1b. An axial distance between the upper face 4b and the lower face 4c of the piston ring groove 4 is greater than a distance between the upper end face 1c and the lower end face 1d of the first compression piston ring 1. Therefore, the first compression piston ring 1 is vertically reciprocally movable within the piston ring groove 4 in accordance with the reciprocal movement of the piston 3. By the reciprocal action of the piston ring 1, a clearance is temporarily formed between the lower face 4c of the ring groove 4 and the lower end face 1d of the piston ring 1 when the upper end face 1c is brought into contact with the upper face 4b of the ring groove 4, and a clearance is temporarily formed between the upper face 4b of the ring groove 4 and the upper end face 1c of the piston ring 1 when the lower end face 1d is brought into contact with the lower face 4c of the ring groove 4.

The piston 3 is formed with a cooling gallery 7 at a radially inner side of the piston ring groove 4 for internally cooling the piston 3 and the first compression piston ring 1.

The first compression piston ring 1 according to the first embodiment is made from a steel or cast iron and particularly exhibits its superior function when used in a supercharging type diesel engine. The first compression piston ring 1 is not formed with a notch at the inner peripheral surface 1b and near the gap, and is not shaped into an elliptical shape but into an ordinary ring shape. However, the first compression piston ring 1 has the following dimensional limitation: that is, d1/a1 is in a range of from 40 to 60, and d1/h1 is in a range of from 30 to 55, where "d1" represents an inner diameter defined by the inner peripheral surface 1b, "a1" represents a radial length which is a radial distance between the outer peripheral surface 1a and the inner peripheral surface 1b, and "h1" represents an axial length at the outer peripheral surface 1a.

"d1/a1" in the first compression piston ring according to the first embodiment is greater than that of the conventional piston ring. Further, "d1/h1" in the first compression piston ring according to the first embodiment is approximately equal to that of the conventional piston ring.

The reason for defining the lower limit of "d1/a1" to 40 will be described. As disclosed in Japanese Patent Application Publication No. 2000-120866, in the piston ring formed with the notch at the inner peripheral surface thereof and near the gap, surface pressure at the gap is set not more than 0.5 MPa during actual engine operation in order to restrain the excessive wear at the outer peripheral sliding surface of the piston ring and to avoid generation of crack and peel off of the surface treatment layer. Based on this understanding, it is found through experiments that the surface pressure at the gap becomes not more than 0.5 MPa during actual engine operation if "d1/a1" is not less than 40 provided that "a1" is constant in circumferential direction of the ring. Accordingly, the lower limit of "d1/a1" is determined to 40.

The reason for defining the upper limit of "d1/a1" to 60 will be described. This upper limit is configured to make a radial contacting length L1 between the upper end face 1c of the first compression piston ring 1 and the upper end 4b of the ring groove 4 or a radial contacting length between the lower end face 1d of the first compression piston ring 1 and the lower end 4c of the ring groove 4 greater than a radial length L2 of a clearance between the cylinder 2 and a top land 3a positioned closer to the combustion chamber than is the region of the first ring groove 4. If "d1/a1" exceeds 60, the contacting area between the upper end face 1c and the upper face 4b and between the lower end face 1d and the lower face 4c is extremely reduced, so that the sealability at the contacting areas will be lowered. Moreover, instable mobility of the piston ring 1 within the ring groove 4 will result during actual engine operation. Thus, the upper limit of d1/a1 is determined to 60.

According to the first compression piston ring of the first embodiment, d1/a1 is greater than that of the conventional piston ring. That is, "a1" dimension is relatively small with respect to not only near the gap but also an entire periphery of the ring in comparison with the conventional piston ring. A temperature gradient between the inner and outer peripheral surfaces of the piston ring is a major factor for providing a high surface pressure nearby the gap during actual engine operation. In this respect, in the first compression piston ring 1 according to the embodiment, the temperature difference between the inner and outer peripheral surfaces of the piston ring can be reduced because the radial distance therebetween, i.e., a1 dimension, is set small. Consequently, excessive surface pressure increase nearby the gap can be suppressed. It should be noted that in the first compression piston ring 1 according to the embodiment, cutting and grinding process for locally forming the notch to the inner peripheral surface 1b is not required because of the reduction in a1 dimension over the entire periphery of the ring. Thus, the piston ring 1 can be produced at low cost.

Further, radially outwardly expanding force of the piston ring is greatly dependent on a1 dimension. That is, the force is reduced in accordance with the increase in d1/a1 and/or decrease in a1. Because of the reduction in the radially outwardly expanding force, followability of the piston ring to the surface of the cylinder is lowered at a room temperature. However, extremely high pressure is provided within the cylinder of the supercharging type diesel engine during engine operation. If the first compression piston ring 1 according to the embodiment is used in such engine, the extremely high pressure is applied to the clearance between the bottom surface 4a of the ring groove 4 and the inner peripheral surface 1b to urge the piston ring 1 radially outwardly toward the cylinder 2. Particularly, because the compression piston ring 1 is the first compression ring to which the engine pressure is directly applied, the radially outwardly urging force is extremely high. Consequently, even though self-expanding force in radially outward direction of the piston ring 1 is low, the outer peripheral sliding surface 1a of the ring 1 can be in intimate contact with the cylinder 2 because of the high engine pressure applied from the inner peripheral surface 1b of the ring 1 provided that ring exhibits low bending rigidity. Thus, sealing function for sealing gas and oil can be maintained.

Bending rigidity of the piston ring is greatly dependent on a1 dimension. That is, bending rigidity as well as expansion force of the piston ring will be lowered in accordance with increase in d1/a1 or decrease in a1 dimension. Because of the reduction in bending rigidity, the piston ring 1 can be easily urged toward the cylinder 2 from its inner peripheral surface during engine operation. Particularly, if the first compression piston ring 1 is used in the supercharging type diesel engine, high engine pressure can be used as much as possible for urging the ring 1 from the inner peripheral surface of the ring toward the cylinder 2 to improve followability of the piston ring relative to the cylinder 2. Moreover, because the first compression piston ring 1 is urged toward the cylinder 2 from the side of its inner peripheral surface 1b by making use of the engine pressure, uniform contact is provided over the entire outer peripheral surface 1a of the piston ring 1 relative to the cylinder 2, thereby obviating local heat deformation which may incur excessively high local surface pressure.

Further, by relatively reducing a1 dimension of the first compression piston ring 1, a depth of the ring groove 4 can be reduced, i.e., a radial distance between the bottom surface 4a and the peripheral surface of the piston 3 can be reduced. This can increase a diameter defined by the bottom surface 4a. As a result, rigidity of the top land 3a and a second land 3b can be improved, and an internal volume of the cooling gallery 7 positioned radially inwardly of the ring groove 4 can be increased. In other words, a contour of the cooling gallery 7 can be positioned close to the bottom surface 4a of the ring groove 4 assembling therein the first compression piston ring 1. With such an arrangement, a temperature increase of the piston 3 can be suppressed to avoid sticking of the first compression piston ring 1 to the ring groove 4. Moreover, excessive temperature increase of the first compression piston ring 1 can also be restrained, thereby suppressing thermal deformation thereof to avoid excessive increase in surface pressure nearby the gap.

The reason for defining the lower limit of "d1/h1" to 30 will next be described. As described above, the contacting area between the first compression piston ring 1 and the ring groove 4 is relatively small, because "d1/a1" of the present embodiment is greater than, and a1 dimension is relatively smaller than those of the conventional piston ring. On the other hand, if "d1/h1" becomes less than 30, "h1" becomes relatively greater than "d1", and therefore, a mass of the piston ring will be increased, to thus increase inertial force of the piston ring. As described above, "a1" dimension in the present embodiment is relatively small, so that the upper end face 1c and the lower end face 1d of the first compression piston ring 1 contact the upper and lower faces 4b and 4c respectively with relatively small contacting areas. Accordingly, if h1 becomes extremely greater than a1, a greater inertial force is applied to the small contacting areas in accordance with the vertical reciprocating motion of the piston 3, so that greater load is applied to the small contacting areas. Consequently, wear at the upper and lower faces 4b and 4c of the ring groove 4 may be accelerated. Further, the mobility of the compression piston ring within the piston ring groove 4 will be primarily dominated by the inertial force, which degrades a reaction of the piston ring responsive to the movement of the piston, thereby affecting sealability between the piston ring and the upper and lower faces of the ring groove. Consequently, the lower limit of "d1/h1" is defined into 30.

Next, the reason for defining the upper limit of "d1/h1" to 45 will be described. This upper limit is determined taking the heat conducting function of the first compression piston ring 1 for propagating a heat from the piston 3 to the cylinder 2 and self-expanding force of the piston ring into consideration. If "d1/h1" is more than 45, "h1" dimension becomes relatively small, to reduce a cross-sectional area of the piston ring, thereby reducing self-expansion force of the piston ring to thus lower the followability of the piston ring to the cylinder 2. Moreover, a contacting area between the piston ring and the cylinder, that is, an area of the outer peripheral sliding surface 1a of the piston ring becomes small in accordance with the decrease in h1 dimension. Accordingly, heat conduction efficiency from the piston ring to the cylinder may be lowered to thus increase thermal load with respect to the piston and the piston ring.

Surface pressure distribution in the first compression piston ring 1 according to the embodiment will be described. Three piston rings each having constant a1 dimension were produced as test pieces 1 through 3 for investigating surface pressure distribution in a surface pressure measuring device shown in FIG. 2. The test pieces 1 and 2 had d1/a1 of 28.4 and 36, respectively. The test piece 3 had d1/a1 of 43.2, which was in accordance with the first compression piston ring of the first embodiment. Table 1 shows various dimensions and test results of these test pieces, in which "a1" represents a radial length of the piston ring, "h1" represents an axial length of the piston ring, "d1" represents an inner diameter of the piston ring defined by the inner peripheral surface thereof, and "Ft" represents self expanding force of the piston ring. RSP represents a reference surface pressure (MPa) of the piston ring measured at a portion other than the gap and nearby the gap. Test pieces 1 through 3 were made from JIS SUS410J1, to which heat treatment were not conducted but Cr plating were formed at respective surfaces thereof.

TABLE 1

|  | a1 (mm) | h1 (mm) | Ft (kgf) | d1/a1 | d1/h1 | RSF (MPa) |
| --- | --- | --- | --- | --- | --- | --- |
| Test Piece 1 | 3.8 | 3.0 | 2.65 | 28.4 | 36.0 | 0.166 |
| Test Piece 2 | 3.0 | 3.0 | 1.45 | 36.0 | 36.0 | 0.091 |
| Test Piece 3 | 2.5 | 3.0 | 0.71 | 43.2 | 36.0 | 0.044 |

Figure 2:
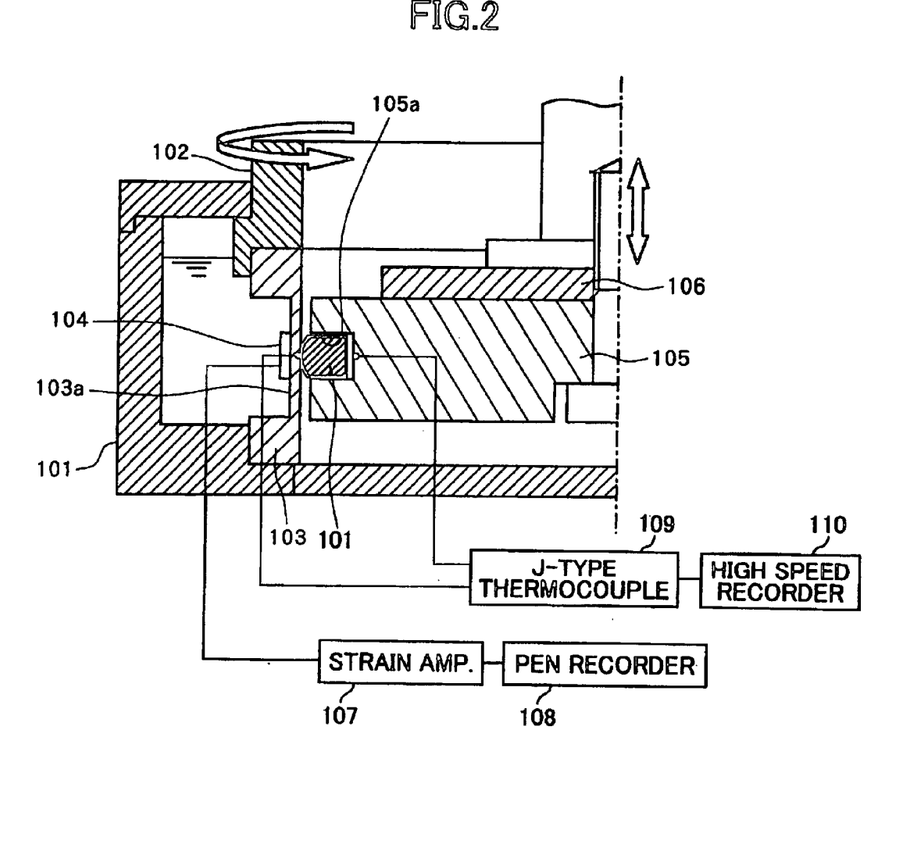
FIG. 2 is a schematic cross-sectional view showing a device for measuring a surface pressure distribution of a piston ring.

FIG. 2 shows a left half portion of the surface pressure measuring device. Cylinders 102 and 103 are supported by a cylinder holder 101. An outer peripheral portion of the cylinder 103 is partly formed with a recess 103a to provide a thin wall portion. The piston ring 101 serving as a test piece is assembled in a piston ring groove 105a of a piston 105, so that an outer peripheral sliding surface of the piston ring 101 is in sliding contact with an inner peripheral surface of the cylinder 103. As a result, a surface pressure is applied from the piston ring 101 to the thin wall portion of the cylinder 103 whereby a strain is generated at the thin wall portion.

A strain gauge 104 is attached to a bottom surface of the recess 103, and a strain amplifier 107 is connected to the strain gauge 104. Further, a pen recorder 108 is connected to the strain amplifier 107 for recording a strain level so that the strain level can be measured as a surface pressure. A J-type thermocouple 109 has one terminal connected to a portion adjacent the piston ring groove 105a and another terminal connected to the inner peripheral surface of the cylinder 103 and within the moving stroke of the piston ring 101. A high-speed recorder 110 is connected to the thermocouple 109 for measuring a temperature. Further, a heater 106 is attached to a top surface of the piston 105 for heating the piston ring 101, whereas cooling water is accumulated in a hollow space defined by the cylinder holder 101 and the cylinders 102, 103 for cooling the cylinder 103. Thus, a temperature gradient distribution over the piston 105, piston ring 101 and the cylinder 103 can be provided similar to the temperature gradient distribution in the actually operated engine.

Figure 3:
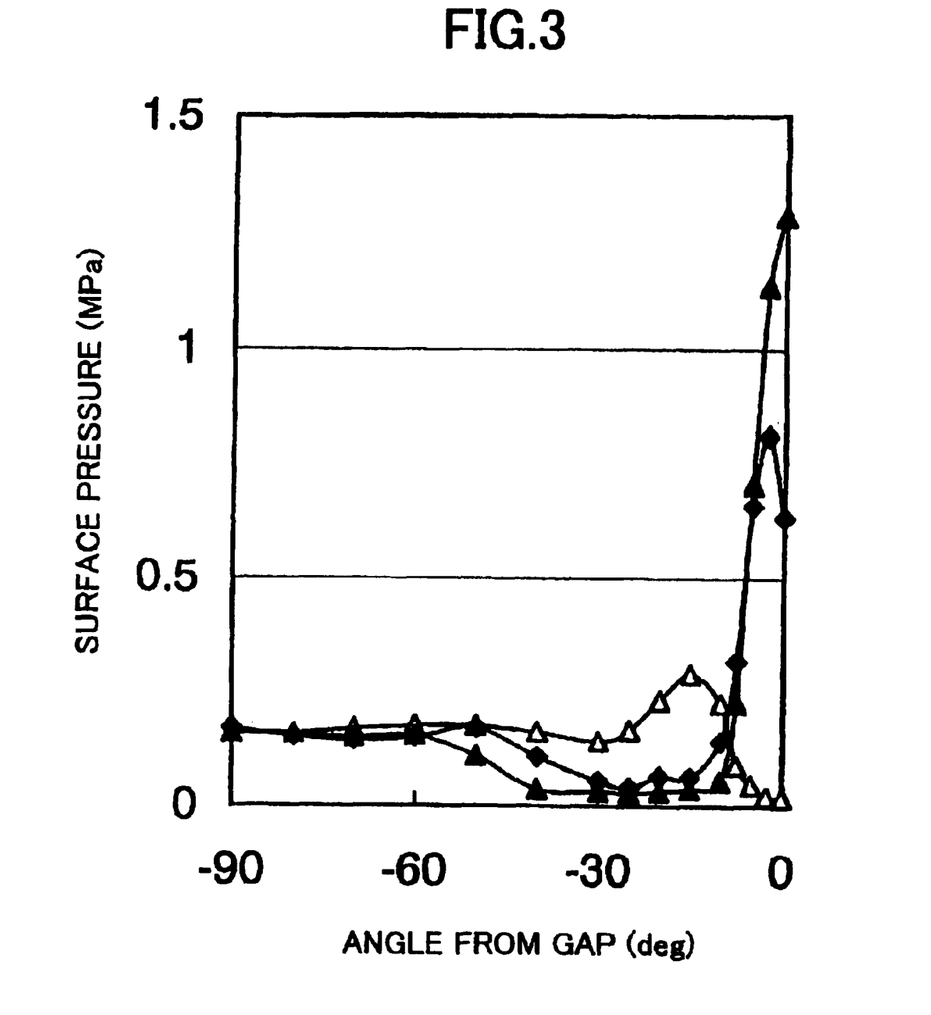
FIG. 3 is a graphical representation showing the relationship between a surface pressure and an angular peripheral position from a gap of a test piece 1.
Figure 4:
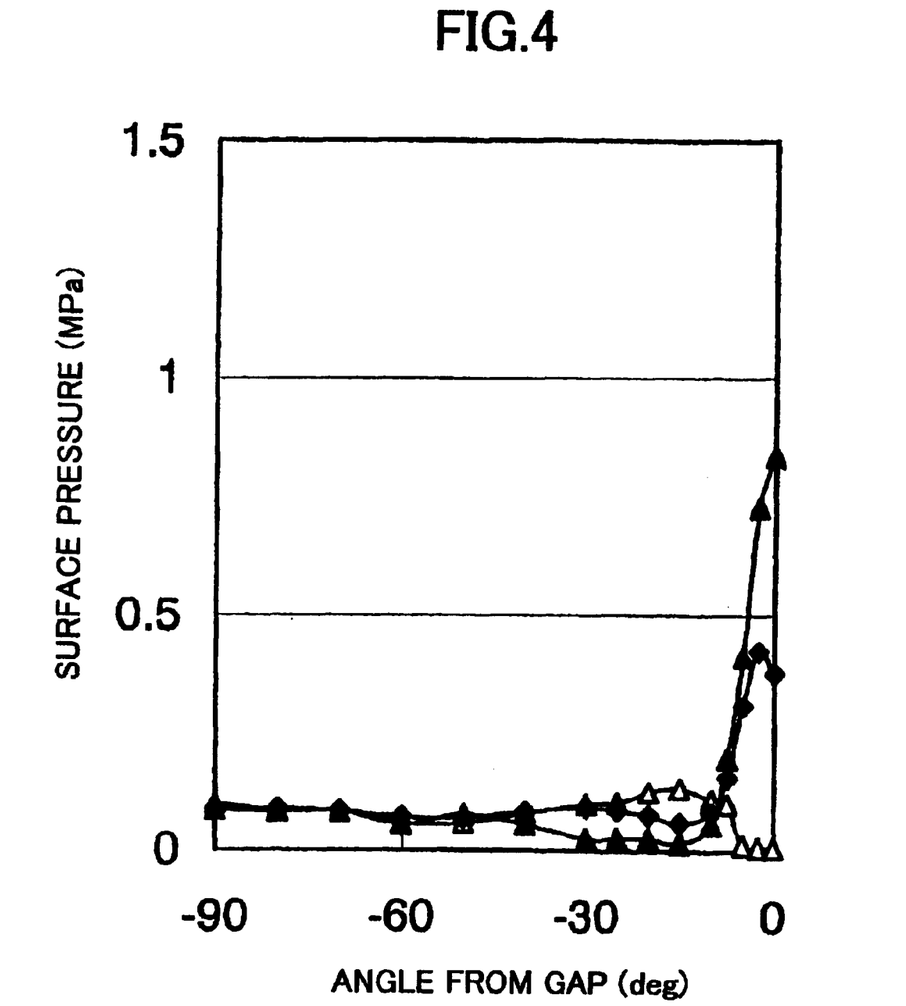
FIG. 4 is a graphical representation showing the relationship between a surface pressure and an angular peripheral position from a gap of a test piece 2.
Figure 5:
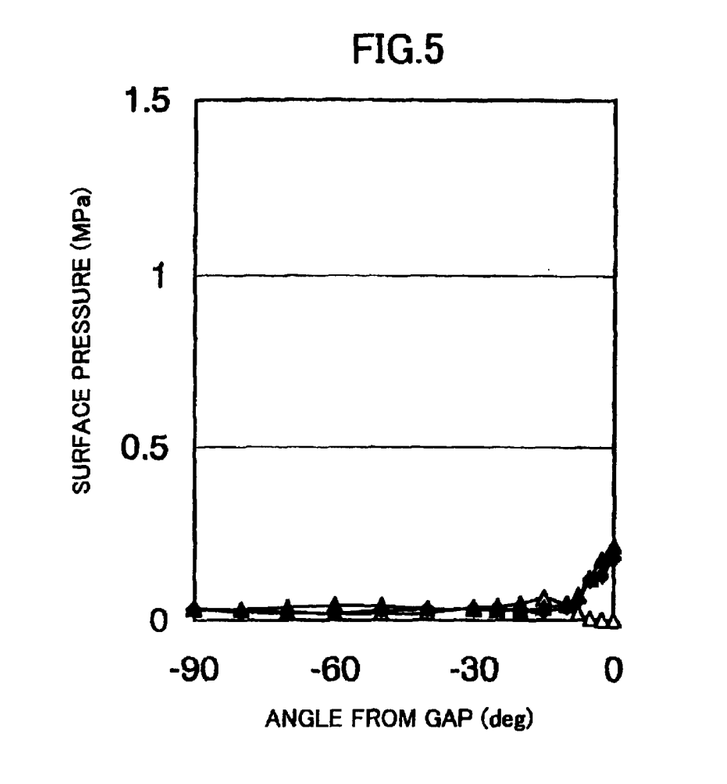
FIG. 5 is a graphical representation showing the relationship between a surface pressure and an angular peripheral position from a gap of a test piece 3.

Experiments were conducted in every output level of the heater 106 of 0 W (room temperature), 375 W and 500 W. FIGS. 3 through 5 show surface pressure distribution in the test pieces 1 through 3, respectively in which an ordinate represents the surface pressure and an abscissa represents a circumferential position on the test piece measured from the gap end thereof. In each graph, white-out triangles, black-out rhombus, and black-out triangles represent the surface pressure distributions at the room temperature, at a heated state with the heater output of 375 W, and at another heated state state with the heater output of 500 W, respectively.

Regarding the test piece 1, surface pressure nearby the gap was excessively increased in case of heating as is apparent from FIG. 3. Further, regarding the test piece 2 as is apparent from FIG. 4, surface pressure nearby the gap was also excessively increased in case of heating, even though the increase level is less than that in the test piece 1. On the other hand, regarding the test piece 3 (the first compression piston ring according to the present embodiment) provided the less increase in surface pressure nearby the gap even by the heating as is apparent from FIG. 5. Incidentally, in the test piece 3, reference surface pressure was also lowered, which however does not affect the followabiliy of the piston ring with respect to the cylinder because of the application of engine pressure to the piston ring during operation of the engine.

Figure 6:
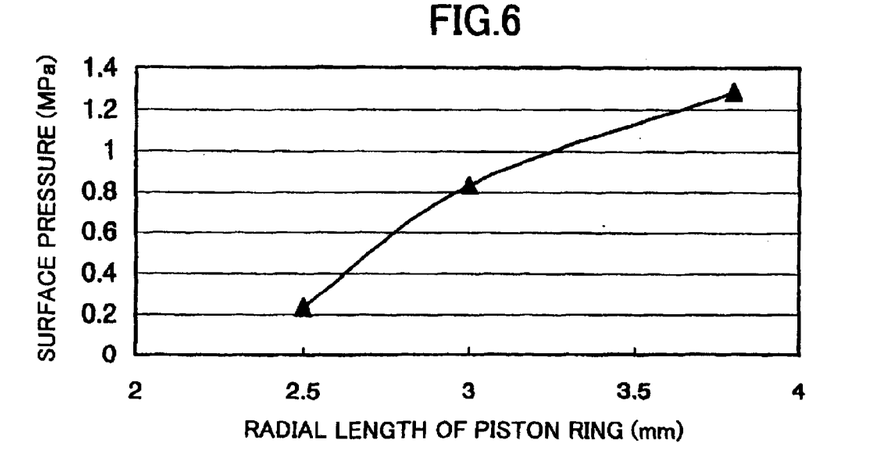
FIG. 6 is a graphical representation showing the relationship between a surface pressure and a radial length a1 of the piston ring.

FIG. 6 shows the relationship between the surface pressure at the gap and a1 dimension in case of heating with the heater output of 500 W. As is understood from the graph a1 dimension of about 2.7 mm provided the surface pressure level at the gap end of 0.5 MPa. This corresponds to d1/a1 of about 40.

Figure 8:
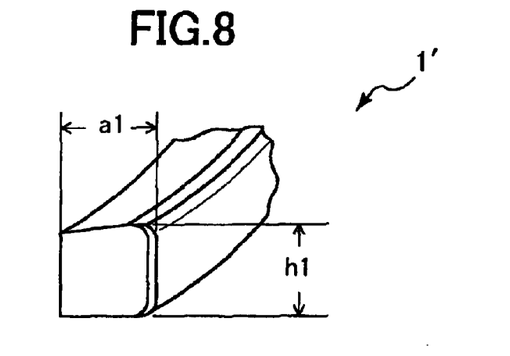
FIG. 8 is a perspective view showing a cross-sectional shape of the first compression piston ring according to a second embodiment of the present invention.

A compression piston ring 1' according to a second embodiment is shown in FIG. 8. The second embodiment pertains to a half keystone ring, in which the lower end face extends perpendicular to the sliding surface, whereas the upper end face is slanted to reduce the axial length at the inner peripheral surface.

Figure 9:
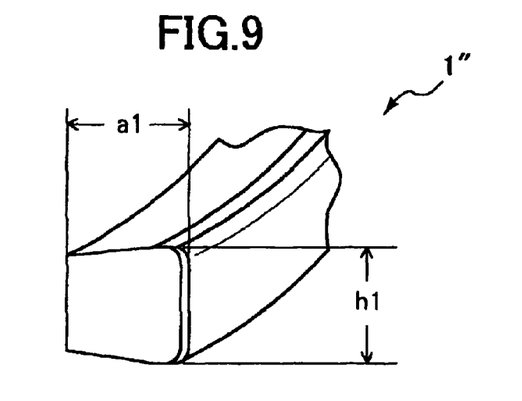
FIG. 9 is a perspective view showing a cross-sectional shape of the first compression piston ring according to a third embodiment of the present invention.

A compression piston ring 1" according to a third embodiment is shown in FIG. 9. The third embodiment pertains to a full keystone ring, in which the upper and lower end faces are slanted symmetrically with each other.

While the invention has been described in detail and with reference to specific embodiments thereof, it would be apparent to those skilled in the art that various changes and modifications may be made therein without departing from the spirit and scope of the invention. For example, the compression piston ring according to the present invention can also be used as second and third compression piston rings as far as deformation of a bore is of small level and high expansion force of the piston ring in radially outward direction is not required. Further, the compression piston ring according to the present invention can be used in an ordinary engine other than supercharging type engine.

What is claimed is:

1. A compression piston ring for use in an internal combustion engine, the piston ring having a generally circular shape and having an outer peripheral sliding surface in sliding contact with a cylinder and an inner peripheral surface in confrontation with a piston, a gap being formed to provide a discontinuity of a circle, the compression piston ring providing $d1/a1$ ranging from 40 to 60 and providing $d1/h1$ ranging from 30 to 55 in which $d1$ represents an inner diameter defined by the inner peripheral surface, $a1$ represents a radial distance between the inner peripheral surface and the outer peripheral sliding surface, and $h1$ represents an axial length of the outer peripheral sliding surface, and wherein the piston ring is made from a steel or cast iron.

2. The compression piston ring as claimed in claim 1, wherein the inner peripheral surface has a circular shape without any formation of a notch.

3. The compression piston ring as claimed in claim 1, wherein the piston ring has a rectangular cross-section.

4. The compression piston ring as claimed in claim 1, wherein the piston ring is a half keystone piston ring.

5. The compression piston ring as claimed in claim 1, wherein the piston ring is a full keystone piston ring.

6. A diesel engine comprising:

a cylinder;

a piston reciprocally movable with respect to the cylinder, and having an outer peripheral surface formed with a plurality of annular piston ring grooves, a combustion chamber being defined above the piston; and a first compression piston ring assembled in a first piston ring groove positioned closest to the combustion chamber among the plurality of the piston ring grooves, the first compression piston ring having a generally circular shape and having an outer peripheral sliding surface in sliding contact with the cylinder and an inner peripheral surface in confrontation with the piston, a gap being formed to provide a discontinuity of a circle, the first compression piston ring providing $d1/a1$ ranging from 40 to 60 and providing $d1/h1$ ranging from 30 to 55 in which $d1$ represents an inner diameter defined by the inner peripheral surface, $a1$ represents a radial distance between the inner peripheral surface and the outer peripheral sliding surface, and $h1$ represents an axial length of the outer peripheral sliding surface, and wherein the first compression piston ring is made from a steel or cast iron.

* * * * *